(No Model.)
L. R. FAUGHT.
Boring Bar.
No. 241,482. Patented May 17, 1881.
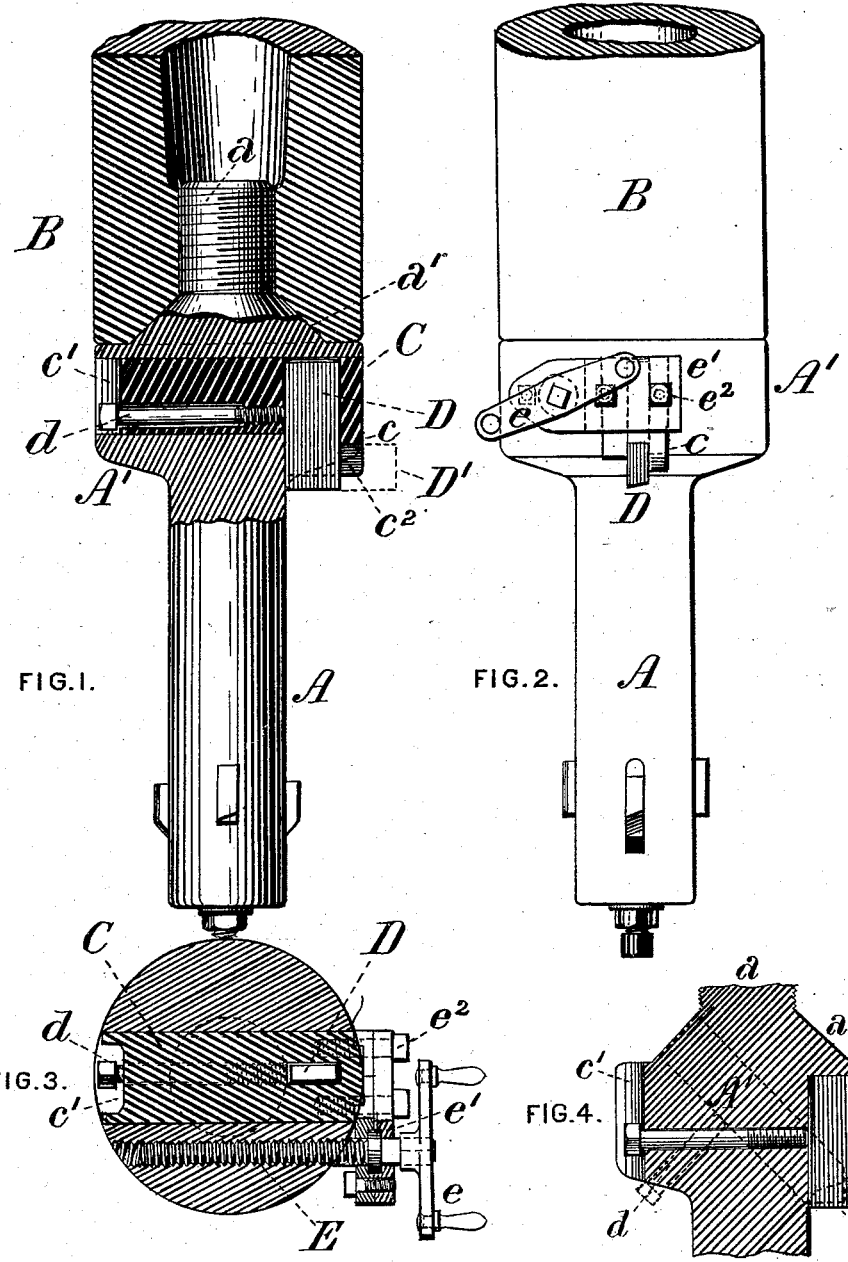

UNITED STATES PATENT OFFICE.

LUTHER R. FAUGHT, OF PHILADELPHIA, PENNSYLVANIA.

BORING-BAR.

SPECIFICATION forming part of Letters Patent No. 241,482, dated May 17, 1881.

Application filed November 15, 1880. (No model.)

*To all whom it may concern:*

Be it known that I, LUTHER R. FAUGHT, of the city and county of Philadelphia, in the State of Pennsylvania, have invented certain new and useful Improvements in Boring-Bars, of which improvements the following is a specification.

The object of my invention is to provide improved facilities for connecting a vertical shouldering or facing tool with a boring-bar, so that the former may be readily removed and replaced, securely held, and conveniently fed transversely to the bar.

To this end my improvements consist in a lipped or shouldered block or holder having a recess to receive a tool which is held in position therein by a set-screw, combined with a boring-bar having a slotted head or enlargement adjacent to its end, which is connected to the spindle, the block fitting easily in the head, so as to be fed transversely therein either by hand or by mechanical appliances, as desired. The improvements claimed are hereinafter more fully set forth.

In the accompanying drawings, Figure 1 is a longitudinal central section through a portion of a boring bar and spindle illustrating an application of my invention; Fig. 2, a view, in elevation, of the same at right angles to Fig. 1; Fig. 3, a transverse section through the block and the enlarged head of the boring-bar, and Fig. 4 a vertical central section, showing the tool-holder in a single piece with the boring-bar.

The boring-bar A differs from those of the ordinary construction in the particular that there is formed upon it, adjacent to its junction with the spindle B, a cylindrical head or enlargement, A', the diameter of which is about equal to or slightly less than that of the spindle B. The upper face of the head A' fits neatly against the lower end of the spindle, to which the bar is preferably connected by a threaded stem or prolongation, $a$, engaging a corresponding female thread in the spindle, which stem may either commence directly at the head A', or be connected thereto by a conical neck, $a'$, fitting a similar recess in the end of the spindle, as shown in Fig. 1. A diametric slot of rectangular cross-section is formed in the head A', and a steel block or tool-holder, C, of similar section, is fitted neatly to said slot, so as to slide easily therein in a plane perpendicular to the axis of the bar A, the length of said block being equal, as nearly as may be, to the diameter of the head A'. A vertical slot is formed in the block C upon its longitudinal center line to receive a vertical tool or cutter, D—that is to say, a tool the lower cutting-edge of which is at right angles to the axis of the bar A, the inner face of said slot being substantially in line with the periphery of the bar when the block is entirely within the head, and its narrowest dimension, corresponding to the thickness of the tool, being transverse to the block. The metal of the block at and adjacent to the outer wall of the tool-slot is prolonged downwardly, so as to form a lip or shoulder, $c$, to provide increased support for the cutter D, which is held firmly in position by a set-screw, $d$, engaging a thread in the block and bearing upon the tool in a direction parallel to the line of its cutting-edge. A recess, $c'$, is formed in the end of the block C farthest from the tool-slot, to receive the head of the set-screw $d$ and prevent the protrusion thereof beyond the circumference of the spindle, to admit of the latter, with the attached head and boring-bar, to be drawn up into its box, when required, for the removal of the work from the table. A recess, $c^2$, is formed in the lip $c$, in line with and corresponding in width to the tool-slot, the purpose thereof being to adapt the tool-holder for the reception of a broad-faced finishing-tool, which would consist of the shank D and the part D', as indicated in dotted lines in Fig. 1.

The tool-holder, as described, may be fed outwardly, to increase the diameter of the cut, by the direct application of the hand of the operator; or, if preferred, the arrangement shown in Figs. 2 and 3 may be adopted for the purpose, the same consisting of a screw, E, rotated by a hand wheel or lever, $e$, in a bearing, $e'$, connected by bolts $e^2$ to the tool-holder, so as to be attached to or detached from the same at pleasure, said screw engaging a thread in the head A'. Inasmuch as such attachments must necessarily protrude beyond the circumference of the spindle, it will be obvious that where they are employed they must, together with the tool-holder, be removed from the boring-bar when the spindle is to be drawn up into the box.

I contemplate further effecting the outward feed of the tool-holder automatically, and have devised suitable mechanism for such purpose; but as the same does not constitute part of my present invention, and is, moreover, fully described and shown by me in another application for Letters Patent of the United States of even date herewith, it need not be herein specifically set forth.

Under certain circumstances, specially in the case of bars of small diameter, the alternative form of my invention shown in Fig. 4 will be found desirable, the same differing from that hereinbefore described, in that the tool-holder, instead of being separate from and movable relatively to the boring-bar, is formed in a single piece with the head thereof. It will be obvious that in such case the advantage of a transverse feed to the cutter must be dispensed with, but the same facilities of inserting, holding, and removing the tool obtain as where a separate block is employed.

I claim as my invention and desire to secure by Letters Patent—

1. A tool-holder having a tool-slot in its longitudinal center line adjacent to one of its ends, a downwardly-projecting lip or shoulder exterior to said slot, and a tool clamping or holding screw, combined with a boring-bar having a head or enlargement slotted transversely through its axial center line, to receive and admit of the free transverse movement of the tool-holder, substantially as set forth.

2. The combination, substantially as set forth, of a tool-holder having a slot in its longitudinal center line and a centrally-recessed lip or shoulder exterior to said slot, a broad-faced finishing-tool, fitting in said slot and protruding through the recess of the lip or shoulder, and a set-screw by which said tool is clamped within the slot.

3. A tool-holder having a tool-slot in its longitudinal center line adjacent to one of its ends, a downwardly-projecting lip or shoulder exterior to said slot, and a tool clamping or holding screw, combined with a boring-bar having a head or enlargement slotted transversely through its axial center line, to receive and admit of the free transverse movement of the tool-holder, and with a removable screw-feed attachment for producing such transverse movement, substantially as set forth.

L. R. FAUGHT.

Witnesses:
J. SNOWDEN BELL,
WALTER S. GIBSON.